Patented Dec. 19, 1950

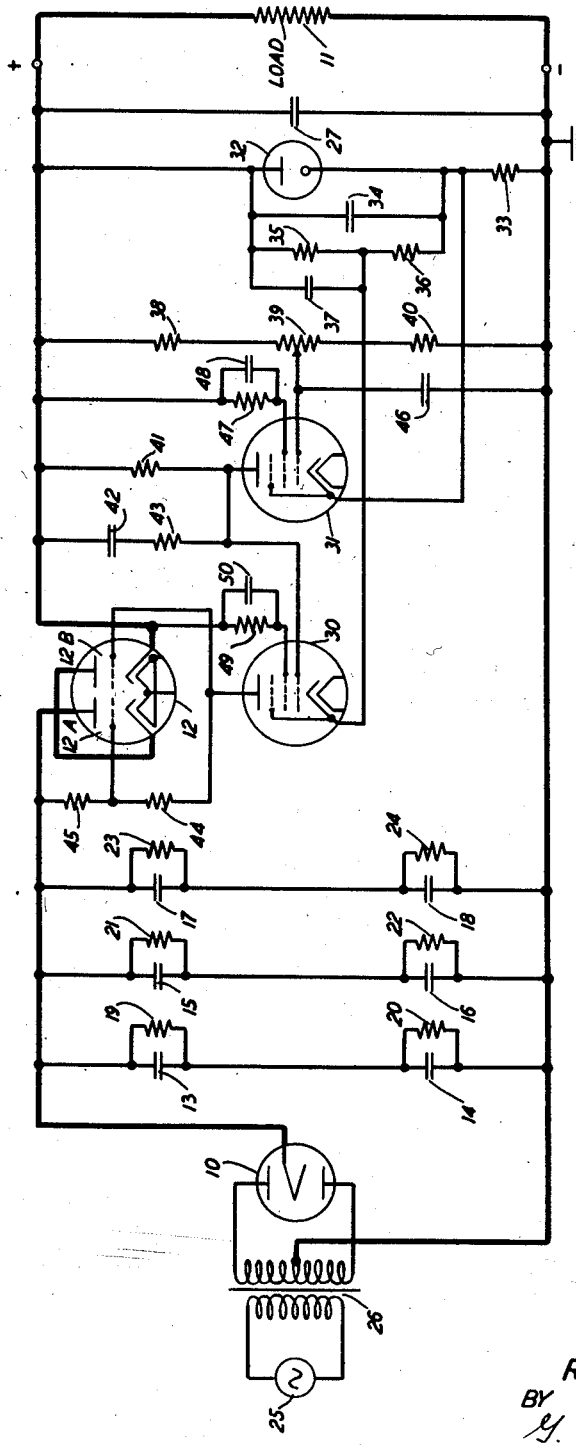

2,534,559

UNITED STATES PATENT OFFICE 2,534,559

VOLTAGE REGULATION

Roy W. Prince, Jr., New York, N. Y., assignor to Bell Telephone Laboratories, Incorporated, New York, N. Y., a corporation of New York Application April 5, 1947, Serial No. 739,561

5 Claims. (Cl. 323—22)

This invention relates to voltage regulation and particularly to improved apparatus for controlling the voltage across a load to which current is supplied from a direct current supply source.

An object of the invention is to provide improved apparatus for minimizing voltage changes across a load with respect to a selectable value of load voltage.

Another object is to provide two space current paths in series with respect to each other in a circuit for supplying current to a load and means for controlling the resistance of the two space current paths in response to resistance changes of a third space current path.

In accordance with an illustrative embodiment of the invention herein shown and described, there are provided in a circuit for supplying direct current to a load two regulator space current triodes having their space current paths connected in series with each other and with the load so that the load current flows through both space current paths in series. A space discharge amplifier is provided for amplifying voltage changes across the load to cause to be set up at the output of the amplifier control voltages for controlling the resistances of the space current paths of the regulator space current devices, respectively, to minimize changes of load voltage with respect to a selectable value of load voltage. The control voltages for the regulator space current triodes are derived from a circuit through which space current is supplied to an amplifier space current device. The load voltage may be set at a desired value within a range of values by adjusting the voltage which is impressed upon the input of the amplifier, this voltage being derived from the load voltage. After the initial adjustment of the load voltage, the regulator circuit functions automatically to minimize load voltage changes.

The single figure of the drawing is a schematic view of a regulated rectifier embodying the invention.

Referring to the drawing, there is provided a rectifier comprising a rectifier space current tube 10 (type 5R4GY) for supplying direct current to a load 11 through the two space current paths in series of a twin-triode regulator tube 12 (type 6AS7G). The rectifier is provided with a ripple filter comprising condensers 13 to 18, inclusive, each of 125 microfarads, and resistors 19 to 24 inclusive, each having a resistance of one megohm, the resistors being connected across the condensers, respectively. The condensers are arranged in three pairs, the condensers of each pair being connected in series across the supply circuit. Current is supplied to the rectifier from a 60-cycle, alternating current source 25 through a transformer 26, the end terminals of the secondary winding of the transformer being connected to the anodes respectively of tube 10 and the mid-terminal of the secondary winding being connected to the negative load terminal which may be grounded as shown. The two triodes of the twin-triode tube 12 are designated 12A and 12B, respectively. If desired, of course, two independent triode tubes could be used instead of the two triodes within a single evacuated housing. It is preferable, however, to employ triodes, the characteristics of which are as nearly matched as possible. The load current path may be traced from the cathode of the rectifier tube 10, through the anode-cathode path of triode 12A, through the anode-cathode path of triode 12B and through the load 11, all in series, to the negative terminal of the rectifier which is the mid-tap of the secondary winding of transformer 26. A four-microfarad filter condenser 27 is connected across the load.

A two-stage amplifier comprising space discharge amplifier tubes 30 and 31 (type 6AK5) is provided for amplifying load voltage changes to set up control voltages for the regulator triodes 12A and 12B. There is connected across the load a shunt current path comprising in series a cold cathode, gas-filled, constant voltage tube 32 (type 0A2) and an 8,000-ohm resistor 33, the tube 32 being shunted by a two-microfarad condenser 34 and by voltage dividing resistors 35 and 36 in series, resistor 35 having a resistance of 47,000 ohms and resistor 36 having a resistance of 8,200 ohms, resistor 35 being shunted by a two-microfarad condenser 37. The tube 32 has a resistance-current characteristic such that the voltage across the tube is maintained substantially constant at 150 volts. Another shunt path across the load comprises in series resistor 38 of 68,000 ohms, 50,000-ohm potentiometer 39 and 38,000-ohm resistor 40. The variable tap of potentiometer 39 is connected to the control electrode of amplifier tube 31. A one-microfarad condenser 46 is provided in a path connecting the variable tap of potentiometer 39 and the negative load terminal. The cathode of tube 31 is connected to the common terminal of constant voltage tube 32 and resistor 33, its screen grid is connected through 10,000 ohm resistor 47 shunted by 0.25 microfarad condenser 49 to the positive load terminal and its anode is connected through .47-megohm resistor 41 to the positive load terminal. In shunt with resistor 41 is connected an anti-sing network comprising .003-microfarad condenser 42 and 15,000-ohm resistor 43 in series.

The control electrode of amplifier tube 30 is connected to the anode of tube 31, the cathode of tube 30 is connected to the common terminal of resistors 35 and 36 and its screen grid is connected through 0.1 megohm resistor 49 shunted by 0.25 microfarad condenser 50, to the positive load terminal. The anode of amplifier tube 30 is connected through resistor 44 of 0.22 megohm and in series therewith resistor 45 of 0.33 megohm to the positive output terminal of the rectifier, that is, to the cathode of rectifier tube 10. The common terminal of resistors 44 and 45 is connected to the control grid of regulator triode 12A and the anode of amplifier tube 30 is connected to the control grid of regulator triode 12B.

The circuit may be used, for example, to supply a direct current having a maximum amplitude of about 0.125 ampere to a load at a desired voltage within a range of 200 volts to 300 volts, the maximum variation of load voltage from a selected value within this range being about ±0.4 volt. The load may also be varied over a range from nearly zero to the maximum load, if desired. The voltage impressed upon the grid-cathode circuit of amplifier tube 31 is the difference of the voltage drop across resistor 33 and the voltage drop across the circuit portion consisting of resistor 40 and in series therewith a variable portion of the resistance of potentiometer 39. As the variable tap of potentiometer 39 is moved downwardly as viewed in the drawing, that is, toward ground potential, the control electrode of tube 31 is made relatively more negative with respect to its cathode, thereby reducing the space current in tube 31 and reducing the voltage drop across resistor 41. The control grid of tube 30 thus becomes relatively less negative with respect to its cathode to cause the anode-cathode resistance of tube 30 to decrease and the space current of the tube flowing through resistors 44 and 45 to increase. The potential of the control grid of triode 12A and the potential of the control grid of triode 12B thus become relatively more negative to cause an increase of resistance of the space current paths of both triodes, thereby reducing the current supplied to the load and the load voltage.

When the setting of the potentiometer is fixed for a certain load voltage, say 300 volts, a small increase of load voltage, for example, will cause the potential of the cathode of tube 32 with respect to ground to increase, due to the increased voltage drop across resistor 33 and will cause the potential of the control grid of tube 31 with respect to ground to increase, due to the increased voltage drop across resistor 40 and a portion of potentiometer 39 in series. However, the entire change of load voltage appears across resistor 33 since the voltage drop across the gas-filled tube 32 is substantially constant. Therefore, the control grid of tube 31 becomes relatively more negative with respect to its cathode and the control grid of tube 30 becomes relatively less negative with respect to its cathode to cause increased current to flow through resistors 44 and 45.

The control grids of triodes 12A and 12B thus become relatively more negative and the resistance of the space current paths in series of the triodes 12A and 12B is therefore increased. The initially assumed rise of load voltage is thus minimized.

The resistance values of resistors 44 and 45 and other circuit constants are preferably so chosen that for any normal operating condition the potential of the control grid of triode 12A with respect to its cathode potential will be such relative to the potential of the control grid of triode 12B with respect to its cathode potential, that the resistances of the space current paths of the triodes are of the same order of magnitude. The resistances of the triodes 12A and 12B may differ by an amount which varies with changes of the operating conditions. For one condition, for example, the resistances may differ by three per cent, while for another condition they may differ by ten per cent or twenty per cent, for example. However, for any normal operating condition, the resistances of the triodes, respectively, are of the same order of magnitude. The space current of amplifier tube 30 varies in response to a change of input voltage impressed upon the amplifier comprising tubes 31 and 30, which change of input voltage may be produced either in response to a change of load voltage or in response to a change of the setting of potentiometer 39. The resistances of the space current paths of the regulator triodes, respectively, change by substantially equal amounts in response to a change of space current of amplifier tube 30. Therefore, the change of resistance introduced in the load circuit by the regulating means for a certain change of input voltage impressed upon the amplifier is about twice as great when two triodes in series are used as the regulating means than is the case when a single triode is used. The circuit employing two regulator triodes is thus more effective in maintaining the load voltage substantially constant irrespective of line voltage changes or load changes and is also more effective in the adjustment of the load voltage to a desired value by changing the setting of the potentiometer.

What is claimed is:

1. A voltage regulator for controlling the voltage across a load to which current is supplied from a direct current source comprising two regulator space current devices each having an anode, a cathode and a control electrode, means for connecting the space current paths of said devices in series with each other and with the load with respect to said current source, an amplifier space current device having an anode, a cathode and a control electrode, means for supplying current from said source to said amplifier space current device, means for controlling the resistance of the space current path of said amplifier space current device in response to load voltage changes, and means responsive to resistance changes of the space current path of said amplifier space current device for simultaneously similarly changing by the same order of magnitude the resistances of the space current paths of both said regulator space current devices.

2. Means for controlling the resistance of a circuit for supplying current from a source to a load comprising space current means having two space current paths connected in series with each other and with the load so that the load current flows through said space current paths in series, a second circuit to which current is supplied from said source and means for simultaneously similarly varying by the same order of magnitude the resistances of said space current paths in response to changes of current flowing in said second circuit.

3. A current supply circuit for supplying current from a direct current source to a load comprising two space current means each having an anode, a cathode and a control electrode, means for conductively connecting the anode of a first of said space current means to the positive terminal of said current source, means for conductively connecting the cathode of said first space current means to the anode of the second space current means, means for conductively connecting the cathode of said second space current means to a terminal of the load, means for conductively connecting the other load terminal to the negative terminal of the current source to complete a circuit for supplying current to the load, resistance means, means for connecting different points of said resistance means to the anode of said first space current means, to the control electrode of said first space current means and to the control electrode of said second space current means, respectively, and means for supplying from said source to said resistance means current the amplitude of which may vary to cause the resistances of the anode-cathode paths of said space current means to be controlled simultaneously, thereby controlling the current supplied from said source to said load.

4. In combination, a first and a second space current device each having an anode, a cathode and a control electrode, means for supplying current from a direct current source through the anode-cathode paths of said first and second space current devices and a load, all connected in series, a second circuit to which current is supplied from said source, means for causing the current in said second circuit to vary, and means connected to said second circuit for causing the potential of the control electrode of said first device with respect to its cathode potential and the potential of the control electrode of said second device with respect to its cathode potential to vary in the same sense and by amounts of the same order of magnitude simultaneously.

5. In combination, a first and a second space current device each having an anode, a cathode and a control electrode, means for conductively connecting the anode of said first device to the cathode of said second device, means for supplying current from a direct current source to a circuit comprising the space current paths of said first and second devices in series, a first current path for connecting the control electrode and cathode of said first device for impressing upon its control electrode with respect to its cathode a potential which may vary to cause the voltage across the space current path of said first device to vary, a second current path comprising the space current path of said first device and said first current path in series for connecting the control electrode and cathode of said second device, and means in said second current path for setting up therein in series with the voltage across the space current path of said first device and the voltage across said first current path a third voltage component which is opposed to the voltage across the space current path of said first device and of the same order of magnitude as the voltage across the space current path of said first device.

ROY W. PRINCE, Jr.

REFERENCES CITED

The following references are of record in the file of this patent:

UNITED STATES PATENTS

| Number | Name | Date |
|---|---|---|
| 2,401,096 | Paradise | May 28, 1946 |
| 2,416,922 | Irish | Mar. 4, 1947 |
| 2,424,905 | Scheldorf | July 29, 1947 |

OTHER REFERENCES

"Current Stabilizers," Proceedings of the I. R. E., July 1944 (pp. 415–418).